United States Patent
Zaseck et al.

(10) Patent No.: US 11,364,929 B2
(45) Date of Patent: Jun. 21, 2022

(54) SYSTEMS AND METHODS FOR SHARED CONTROL OF A VEHICLE

(71) Applicant: Toyota Research Institute, Inc., Los Altos, CA (US)

(72) Inventors: Kevin M. Zaseck, New Hudson, MI (US); Carrie Bobier-Tiu, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 317 days.

(21) Appl. No.: 16/240,043

(22) Filed: Jan. 4, 2019

(65) Prior Publication Data
US 2020/0216090 A1 Jul. 9, 2020

(51) Int. Cl.
*B60W 50/12* (2012.01)
*B60W 30/095* (2012.01)
*B60W 30/12* (2020.01)
*G06V 20/58* (2022.01)
*G06V 20/56* (2022.01)

(52) U.S. Cl.
CPC ........ *B60W 50/12* (2013.01); *B60W 30/0953* (2013.01); *B60W 30/12* (2013.01); *G06V 20/58* (2022.01); *G06V 20/588* (2022.01); *B60W 2420/42* (2013.01); *B60W 2420/52* (2013.01); *B60W 2554/00* (2020.02)

(58) Field of Classification Search
None
See application file for complete search history.

(56) References Cited

U.S. PATENT DOCUMENTS

| | | | |
|---|---|---|---|
| 6,954,691 B2 | 10/2005 | Roll et al. |
| 6,974,414 B2 | 12/2005 | Victor |
| 7,620,497 B2 | 11/2009 | Maass |
| 8,478,642 B2 | 7/2013 | Dey et al. |
| 8,489,317 B2 | 7/2013 | Caveney et al. |
| 8,744,648 B2 | 6/2014 | Anderson et al. |
| 9,047,780 B2 | 6/2015 | Guarnizo Martinez et al. |
| 9,165,477 B2 | 10/2015 | Wilson |
| 9,216,745 B2 | 12/2015 | Beardsley et al. |
| 9,342,986 B2 | 5/2016 | Dariush |
| 9,645,577 B1 | 5/2017 | Frazzoli et al. |

(Continued)

FOREIGN PATENT DOCUMENTS

EP 3318946 A1 * 5/2018 .......... B60W 30/143

*Primary Examiner* — Navid Z. Mehdizadeh
(74) *Attorney, Agent, or Firm* — Christopher G. Darrow; Darrow Mustafa PC (57) ABSTRACT

System, methods, and other embodiments described herein relate to selectively intervening in manual control of a vehicle by a driver. In one embodiment, a method includes predicting a future state of the vehicle according to at least a current state and a control input. The current state defines at least one attribute of a current trajectory of the vehicle, and the control input defines at least one driver input for controlling the vehicle. The method includes comparing the future state with a state constraint indicating a range within which a target path of the vehicle is acceptable. The target path defines a subsequent trajectory for the vehicle. The method includes selectively modifying the target path according to whether the future state violates the state constraint. The method includes controlling the vehicle according to the target path.

20 Claims, 5 Drawing Sheets

(56) References Cited

U.S. PATENT DOCUMENTS

| | | |
|---|---|---|
| 9,751,534 B2 | 9/2017 | Fung et al. |
| 2006/0085131 A1 | 4/2006 | Yopp et al. |
| 2007/0233386 A1* | 10/2007 | Saito .................... G08G 1/167 |
| | | 701/300 |
| 2008/0120025 A1 | 5/2008 | Naitou et al. |
| 2010/0082195 A1 | 4/2010 | Lee et al. |
| 2010/0131148 A1 | 5/2010 | Camhi et al. |
| 2010/0131233 A1 | 5/2010 | Deng et al. |
| 2011/0169625 A1 | 7/2011 | James et al. |
| 2013/0325210 A1 | 12/2013 | Palm |
| 2014/0358327 A1 | 12/2014 | Nordbruch |
| 2015/0266503 A1* | 9/2015 | Schramm ............... B62D 6/008 |
| | | 701/41 |
| 2016/0225201 A1 | 8/2016 | Hiroki |
| 2017/0088142 A1 | 3/2017 | Hunt et al. |
| 2017/0330461 A1 | 11/2017 | Caveney et al. |
| 2018/0162394 A1 | 6/2018 | Kamiya |
| 2018/0194349 A1 | 7/2018 | McGill, Jr. |
| 2018/0257664 A1 | 9/2018 | Remboski et al. |
| 2018/0284775 A1 | 10/2018 | Brettschneider et al. |
| 2018/0356819 A1* | 12/2018 | Mahabadi ............. B60W 30/09 |
| 2020/0207348 A1* | 7/2020 | Sato ................. B60W 60/0053 |

* cited by examiner

SYSTEMS AND METHODS FOR SHARED CONTROL OF A VEHICLE

TECHNICAL FIELD

The subject matter described herein relates, in general, to selectively intervening in manual control of a vehicle, and, more particularly, to selectively modifying a target path of a vehicle while providing deference to driver inputs until the violation of a state constraint.

BACKGROUND

To improve driving safety vehicles can include various driver assist systems that, for example, supervise the operation of the vehicle to catch instances where a driver may not provide adequate controls to avoid obstacles or to simplify the operation of the vehicle by the driver. For example, vehicles may include adaptive cruise control systems that automatically adjust a speed when following a slower vehicle, collision avoidance systems that automatically brake/steer to help avoid accidents and other assistive systems that intervene with the operation of the vehicle to avoid an imminent difficulty. In the instance of the collision avoidance system, the system overrides driver inputs in response to a particular impending collision to improve the present position of the vehicle and avoid the collision that is otherwise imminent.

This intervention by the supervising system can result in unease in the driver especially when the driver believes the intervention is, for example, too soon or otherwise unjustified. Moreover, some active assist systems further function by, for example, forcing a driver to follow what the assistive system identifies as an optimal path along the roadway. In other words, the assistive system does not provide deference to the driver but instead substitutes its own judgment for that of the driver. As such, the driver may become frustrated in attempts to control the vehicle according to their own preferences. Overall, the sense of attempting to control the vehicle against assistive driving systems may affect ride experience and cause the driver to trust the systems less.

SUMMARY

Example systems and methods disclosed herein relate to selectively intervening in manual control of a vehicle according to an approach that provides deference to a driver until the violation of a state constraint. As previously noted, intervention in manual control of a vehicle by assistive systems can affect an overall ride experience of a driver when such intervention is, for example, continuously present or intervening at times that are deemed undesirable by the driver. Therefore, in one embodiment, a control system is disclosed that improves the driver experience through deferring to driver inputs up until the future state of the vehicle (i.e., a target path) violates/exceeds a state constraint (e.g., a road boundary or other defined constraints).

In particular, the control system implements a control approach that, for example, ensures the vehicle stays within the defined constraints (e.g., lateral boundaries, longitudinal speeds, etc.) but does not enforce an optimal path (e.g., always along a centerline of a lane) along the roadway. Thus, the control system permits the driver to control the vehicle within a range defined by the state constraints including up to and along the boundaries of the range. However, once the control system predicts a future state of the vehicle that violates the state constraint (i.e., exceeds in position or magnitude), the control system modifies a target path of the vehicle such that the target path is along the state constraint but does not violate the state constraint. In this way, the control system improves the safety of the vehicle by ensuring the state constraint is not violated while also improving the driver experience through reducing interventions with the manual controls to provide greater deference to the driver.

In one embodiment, a control system for selectively intervening in manual control of a vehicle by a driver is disclosed. The control system includes one or more processors and a memory communicably coupled to the one or more processors. The memory stores a state module including instructions that when executed by the one or more processors cause the one or more processors to predict a future state of the vehicle according to at least a current state and a control input. The current state defines at least one attribute of a current trajectory of the vehicle, and the control input defines at least one driver input for controlling the vehicle. The memory also stores a constraint module including instructions that when executed by the one or more processors cause the one or more processors to compare the future state with a state constraint indicating a range within which a target path of the vehicle is acceptable. The target path defines a subsequent trajectory for the vehicle. The constraint module includes instructions to selectively modify the target path according to whether the future state violates the state constraint. The constraint module includes instructions to control the vehicle according to the target path.

In one embodiment, a non-transitory computer-readable medium for selectively intervening in manual control of a vehicle by a driver and including instructions that when executed by one or more processors cause the one or more processors to perform one or more functions is disclosed. The instructions include instructions to predict a future state of the vehicle according to at least a current state and a control input. The current state defines at least one attribute of a current trajectory of the vehicle, and the control input defines at least one driver input for controlling the vehicle. The instructions include instructions to compare the future state with a state constraint indicating a range within which a target path of the vehicle is acceptable. The target path defines a subsequent trajectory for the vehicle. The instructions include instructions to selectively modify the target path according to whether the future state violates the state constraint. The instructions include instructions to control the vehicle according to the target path.

In one embodiment, a method for selectively intervening in manual control of a vehicle by a driver is disclosed. In one embodiment, the method includes predicting a future state of the vehicle according to at least a current state and a control input. The current state defines at least one attribute of a current trajectory of the vehicle, and the control input defines at least one driver input for controlling the vehicle. The method includes comparing the future state with a state constraint indicating a range within which a target path of the vehicle is acceptable. The target path defines a subsequent trajectory for the vehicle. The method includes selectively modifying the target path according to whether the future state violates the state constraint. The method includes controlling the vehicle according to the target path.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with selectively intervening in manual control of a vehicle according to an approach that provides deference to a driver until the violation of a state constraint. As previously noted, intervention in manual control of a vehicle can affect an overall ride experience of a driver. For example, when a driver deems such intervention to be too early or otherwise subjectively undesirable, the driver may have a negative reaction to the intervention. Therefore, in one embodiment, a control system is disclosed that defers control of the vehicle to driver inputs thereby providing an improved sense of control while still ensuring safety by intervening when the future state of the vehicle (i.e., a target path) violates/exceeds a state constraint (e.g., a road boundary or other defined constraint), and, in one embodiment, minimally modifying the target path to prevent the vehicle from violating the state constraint.

The disclosed control system generally implements a control approach that ensures the vehicle stays within the defined state constraints (e.g., lateral boundaries, longitudinal speeds, etc.) but does not enforce a particular path away from the constraints that is along, for example, a center of the roadway. Thus, as one example, the control system permits the driver to control the vehicle within the constraints of a lane including up to and along the lane markers (i.e., boundaries of the acceptable range). However, once the control system identifies a future state of the vehicle according to control inputs from the driver that violates the state constraint (i.e., exceeds in position or magnitude), the control system intervenes with the control of the vehicle to prevent violation of the state constraint. Consequently, the control system, in one approach, modifies a target path of the vehicle such that the target path is along the state constraint but does not violate the state constraint. In this way, the control system improves the safety of the vehicle by ensuring the state constraint is not violated while also improving the driver experience through reducing the frequency of interventions with the manual controls to provide greater deference to the driver.

Figure 1:
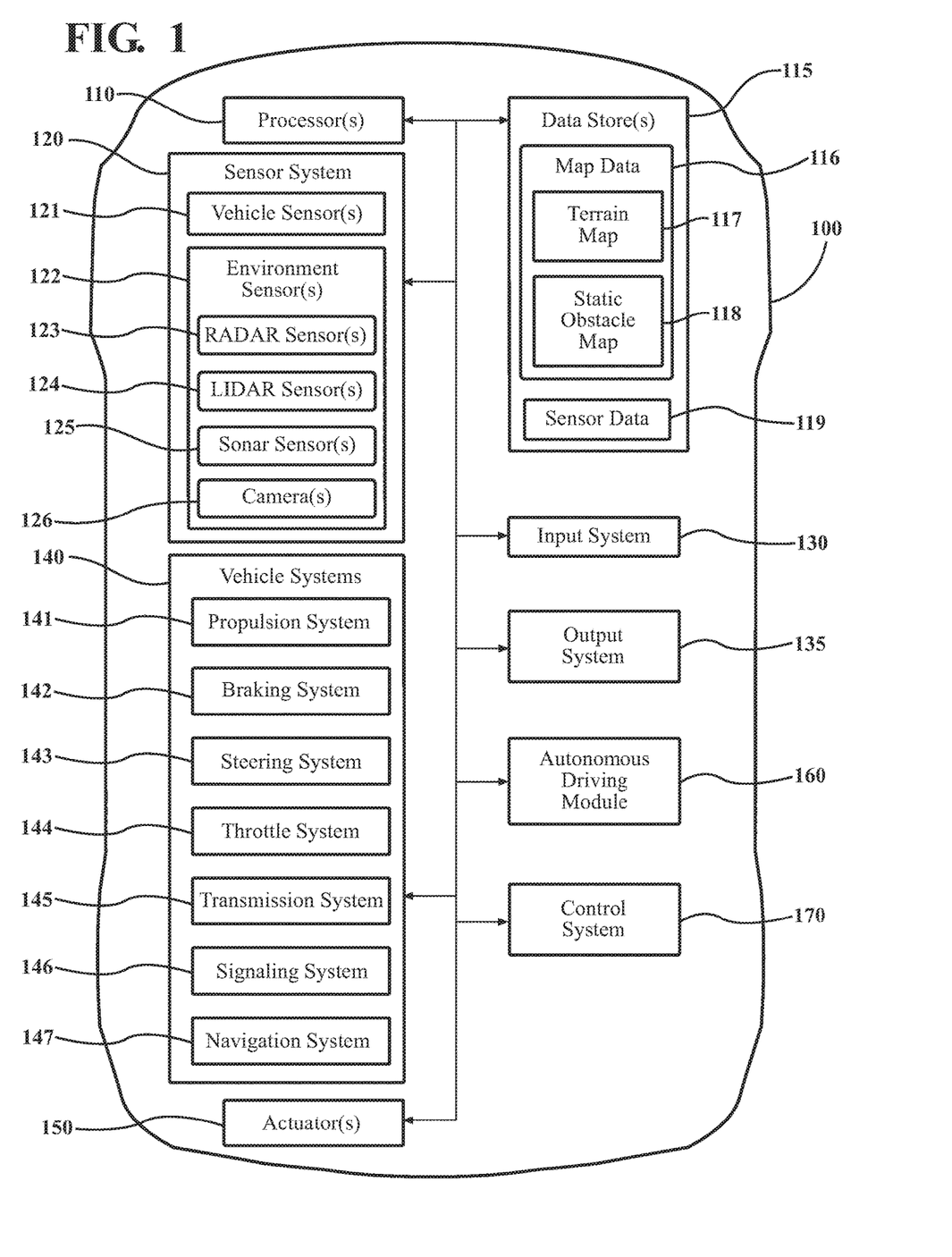
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, proceeds through an environment according to assessed aspects of the environment, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a control system 170 that functions to analyze current control of the vehicle and selectively intervene with the control to prevent violation of constraints. Moreover, while depicted as a standalone component, in one or more embodiments, the control system 170 is integrated with the autonomous driving module 160, the camera 126, or another component of the vehicle 100. It should be noted that while the vehicle 100 is depicted as including the autonomous driving module 160, the autonomous driving module 160 is generally employed along with the presently disclosed systems and methods to, for example, facilitate defining the constraints, and thus does not generally function to implement fully autonomous driving functionality. The noted functions and methods will become more apparent with a further discussion of the figures.

Figure 2:
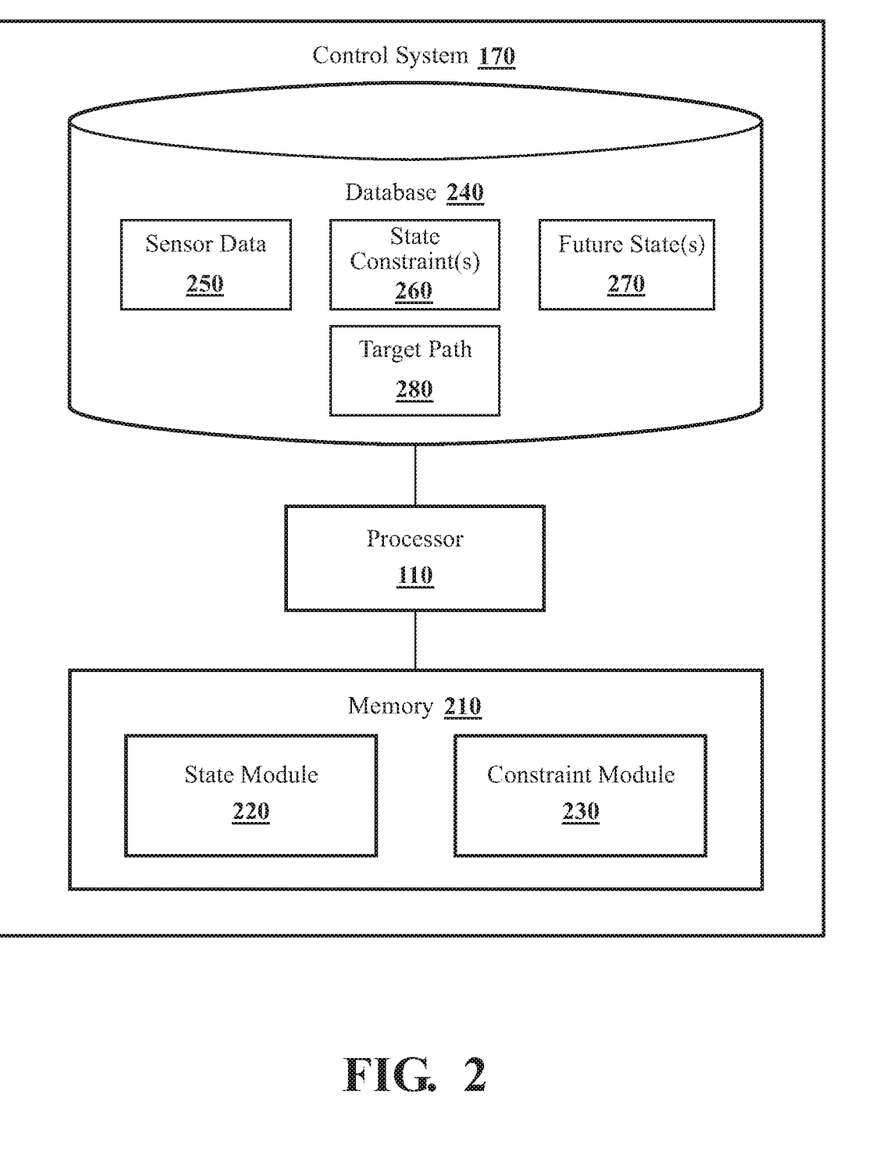
FIG. 2 illustrates one embodiment of a control system that is associated with selectively modifying a target path of a vehicle according to state constraints.

With reference to FIG. 2, one embodiment of the control system 170 is further illustrated. As shown, the control system 170 includes a processor 110. Accordingly, the processor 110 may be a part of the control system 170 or the control system 170 may access the processor 110 through a data bus or another communication path. In one or more embodiments, the processor 110 is an application specific integrated circuit that is configured to implement functions associated with a state module 220 and a constraint module 230. In general, the processor 110 is an electronic processor such as a microprocessor that is capable of performing various functions as described herein. In one embodiment, the control system 170 includes a memory 210 that stores the state module 220 and the constraint module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein.

Furthermore, in one embodiment, the control system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250, a state constraint(s) 260, a future state (s) 270, and a target path 280 along with, for example, other information that is used by the modules 220 and 230.

Accordingly, the state module 220 generally includes instructions that function to control the processor 110 to receive data inputs from one or more sensors of the vehicle 100 that form the sensor data 250, which embodies observations of the surrounding environment of the vehicle 100 including, for example, surrounding lanes and vehicles/obstacles that may be present in the lanes. The control system 170 may be implemented to use multiple sensors of the vehicle 100 including, for example, radar 123 and camera 126 to acquire the sensor data 250. However, it should be appreciated that the disclosed approach can be extended to cover further configurations of sensors such as LiDAR sensors with one or more cameras, different types of LiDARs and cameras, combinations of radars and cameras, sonar, use of a single sensor (e.g., camera), sensors of the surrounding vehicles leveraged via vehicle-to-vehicle communications (v2v), integrated sensors within the vehicle (e.g., IMU), and so on.

Moreover, as a general matter, the state module 220, in one approach, acquires the sensor data 250 and derives the state constraints 260 therefrom. Alternatively, the state module 220 functions cooperatively with the autonomous module 160 to acquire the sensor data 250 and derive the state constraints 260. For example, the autonomous module 160 may implement various routines for performing object detection and recognition, localization, lane marker/boundary identification, and so on. Moreover, the autonomous module 160, in further aspects, includes a trajectory/path planner that aggregates information derived from the sensor data 250 about the surrounding environment in order to identify paths through the environment and characteristics of those paths (e.g., obstacles, surface conditions, etc.). The autonomous module 160, in one embodiment, uses the information to derive the state constraints 260. Thus, the autonomous module 160, in one approach, communicates the state constraints 260 to the state module 220 for use by the control system 170.

In further aspects, the state module 220 operates with the autonomous module 160 to derive the state constraints 260 according to various criteria associated with the functioning of the control system 170. That is, the state module 220 can define characteristics for the state constraints 260 such as which aspects of operation of the vehicle are to be constrained such as environmental constraints (e.g., lateral bounds, longitudinal bounds, etc.), vehicle constraints (e.g., operational bounds such as rate of turn limits, braking limits, etc.), and so on. The state module 220 may define the state constraints 260 from information derived from the surrounding environment by the autonomous module 160 according to, for example, operational preferences of the control system 170, a particular suite of available sensor data 250, and so on. By way of example, the state module 220, in one approach, may implement the state constraints 260 to provide for intervening with a lateral position of the vehicle 100 on the roadway. In the instant example, the control system 170 is, for example, implemented as a lane keeping system to ensure the vehicle 100 maintains position within the lane. Thus, the state module 220 limits the state constraints 260 to the lateral position of the vehicle. Of course, in further embodiments, the state module 220 can provide constraints for other aspects in varying combinations as may be appreciated.

In either case, the state module 220, in one embodiment, controls the respective sensors to provide the data inputs in the form of the sensor data 250. Additionally, while the state module 220 is discussed as controlling the various sensors to provide the sensor data 250, in one or more embodiments, the state module 220 employs other techniques that are either active or passive to acquire the sensor data 250. For example, the state module 220 may passively sniff the sensor data 250 from a stream of electronic information provided by the various sensors to further components within the vehicle 100. Moreover, as previously indicated, the state module 220 can undertake various approaches to fuse data from multiple sensors when providing the sensor data 250 and/or from sensor data acquired over a wireless communication link (e.g., v2v) from one or more surrounding vehicles. Thus, the sensor data 250, in one embodiment, represents a combination of measurements acquired from multiple sensors.

The sensor data 250 itself generally provides information to identify surrounding vehicles, identify lane markings, identify surfaces, and characteristics of objects in the environment, and so on. Moreover, the state module 220, in one embodiment, controls the sensors to acquire the sensor data 250 about an area that encompasses 360 degrees about the vehicle 100 in order to provide a comprehensive assessment of the surrounding environment. Of course, in alternative embodiments, the state module 220 may acquire the sensor data 250 about a forward direction alone when, for example, the vehicle 100 is not equipped with further sensors to include additional regions about the vehicle and/or the control system 170 is, for example, not concerned about constraints outside of a forward direction of the vehicle 100.

Whichever approach is undertaken within the control system 170, the state constraints 260 generally define a range of values for future state (e.g., trajectory) of the vehicle 100 that are acceptable operational values. That is, the constraints 260 define outside boundaries for a range of acceptable values of particular aspects of the vehicle 100. Thus, as one example, the state constraints 260, in one implementation, define lateral boundaries of a trajectory/path that may be defined according to, for example, boundaries of a current lane of the vehicle 100. In further aspects, the state module 220 defines the lateral boundaries according to edges of a road, edges of a driveway, outside boundaries of a roadway including multiple lanes of travel, and so on. As a further example, the state constraints 260 can include boundaries defining a range for a maximum speed (e.g., a current speed limit of a road) and a minimum speed (e.g., 10 mph, 0 mph, −10 mph). In further aspects, the state constraints 260 define maximum lateral forces, maximum braking pressure/rate, maximum turn rates according to current speeds, and so on. As a general matter, the state constraints 260 are defined without limitation and can include environmental aspects, operational aspects, combinations of the two and/or other quantifiable aspects about the functioning of the vehicle 100, which the control system 170 can monitor and intervene with in order to improve operation and safety of the vehicle 100.

Moreover, with further reference to FIG. 2, in one embodiment, the state module 220 generally includes instructions that function to control the processor 110 to execute various actions in support of the control system 170. For example, in one embodiment, the state module 220 receives the sensor data 250 and uses the sensor data 250 to predict a future state of the vehicle 100. The state module 220 may employ different approaches to predicting the future state 270 of the vehicle 100 but, in general, the state module 220 predicts the future state 270 according to at least a current control input of the driver and a current state of the vehicle.

The current control input, in one embodiment, includes steering inputs, braking inputs, and accelerator inputs. The current control input may define the noted aspects as discrete values indicating an extent of input for the respective control, as a current extent/degree along with a rate of change, according to a pattern of the control for a respective time period, and so on. Whichever approach the control system 170 implements to define the control input, the state module 220 uses at least the control input to predict the future state 270.

Furthermore, the state module 220 also uses the current state of the vehicle 100 to predict the future state 270. In one embodiment, the current state includes a current trajectory of the vehicle 100 (e.g., speed and heading). In further aspects, the current state also includes a position of the vehicle 100 within a roadway, operating characteristics of the vehicle 100 (e.g., engine rpm, system conditions such as transmission gear, wheel slip, etc.), environmental characteristics (e.g., weather conditions, road topology, navigation route, etc.).

Accordingly, the state module 220 predicts the future state 270, in one embodiment, according to the current state of the vehicle 100 and the control input(s) from the driver. As such, the state module 220 may compute the future state 270 by, for example, holding the current control inputs constant and determining a target path 280 of the vehicle 100 according to the current trajectory and the control inputs if held constant over a prediction horizon. The prediction horizon generally defines a window of time (e.g., x seconds) into the future over which the state module 220 predicts the future state 270 of the vehicle 100. Thus, in practice, the future state may be comprised of a plurality of predicted states at separate time steps out to the prediction horizon that shifts as the vehicle 100 progresses along the roadway. Thus, by way of example, if the prediction horizon defines a window of five seconds, then the state module 220 may generate separate predictions at intervals of 0.1 s overs the prediction horizon to form the future state 270 of the vehicle 100. Thus, the future state 270 generally defines a predicted path extrapolated from a current trajectory and at the defined intervals over the prediction horizon.

Returning to how the state module 220 predicts the future state 270, the state module 220, as mentioned, in one approach, holds the current control inputs constant over the prediction horizon and according to a current trajectory to predict the future state 270. In further approaches, the state module 220 decays the control inputs back to a mean or constant point over the prediction horizon to predict the future state 270. In still further approaches, the state module 220 implements a model (e.g., model predictive control (MPC), a machine learning algorithm, etc.) that predicts the future state according to more complex understandings of the control inputs, current state, and the surrounding environment. For example, in one embodiment, the state module 220 defines constraints on control inputs such as operational constraints that the state module 220 accounts for when predicting the future state 270. The operational constraints include aspects such as a maximum steering angle, engine torque limits, braking limits, traction limits, and so on. As a general characterization, the operational constraints are limits on the operation of the vehicle 100 that are defined according to mechanical limits of the vehicle 100 and/or physical limits of the vehicle 100 in relation to the environment (e.g., traction between wheels and a road).

Therefore, in one approach, the state module 220 accounts for the operational limits when predicting the future state 270 by, for example, limiting the control inputs over the prediction horizon according to the operational constraints. In other words, the state module 220 defines the operational constraints according to, for example, boundaries of actuators in the vehicle 100. Thus, instead of strictly holding the control inputs constant, decaying the control inputs, or performing another similar function when accounting for the control inputs, the state module 220 imposes the operational constraints to account for the various limits when predicting the future state 270. Accordingly, the state module 220, in predicting the future state 270, in one embodiment, alters the control inputs according to the operational constraints (e.g., max/min steering angle, max/min lateral force for traction, etc.). Thus, the state module 220 defines the control inputs out to the prediction horizon according to a particular approach (e.g., holding a control input constant or decaying the control input according to a predicted rate) and also according to the operational constraints such that the control inputs account for the operational constraints. As one example, the state module 220 extrapolates a rate of turn for steering until the maximum steering angle is achieved at which point the steering angle is held according to the operational constraint for the particular actuator. Thus, the state module 220 can account for various operational constraints of the vehicle 100 when generating the future state 270.

Thus, the particular approach implemented by the state module 220 may vary according to particular aspects of the implementation but generally functions to predict the future state 270 through computing estimates of position, velocity, and so on at points into the future beyond a current state of the vehicle. In this way, the state module 220 can predict when control inputs from the driver are likely to exceed safe operating boundaries as defined by the state constraints 260, and thus permits the control system 170 to take mitigating actions to prevent undesirable outcomes.

Moreover, with further reference to FIG. 2, in one embodiment, the constraint module 230 generally includes instructions that function to control the processor 110 to execute various actions. For example, in one embodiment, the constraint module 230 accepts the future state 270 and the state constraint(s) 260 as electronic inputs and determines whether the future state 270 violates at least one of the state constraints 260. In other words, the constraint module 230 compares the future state 270 with the state constraint 260 and determines whether the future state violates the state constraint 260.

In one embodiment, the constraint module 230 identifies the future state 270 as violating the state constraint 260 when, for example, the future state 270, or at least one parameter thereof exceeds a boundary of the state constraint 260. As previously identified, the state constraint 260 defines a range of values within which the future state 270 is acceptable (i.e., within safety tolerances). However, once the future state 270 exceeds (i.e., is outside of the range) a boundary of the state constraint 260, then the constraint module 230 identifies the occurrence, which is associated with a potentially unsafe operating condition of the vehicle 100, and provides the target path 280 in a form that is safe for the vehicle 100 to operate. Thus, the constraint module 230 subsequently intervenes with the control input provided by the driver in order to cause the vehicle 100 to follow the target path 280 as modified.

That is, the constraint module 230 modifies the target path over the future state 270 of the vehicle 100 to ensure that the state constraint 260 is not actually violated when the vehicle reaches a point in the future that corresponds to the violation. For example, the future state 270 of the vehicle 100 generally defines a target path 280 or predicted path over the prediction horizon as estimated according to the state module 220. As such, the target path 280 defined by the future state 270 intersecting with or otherwise exceeding a boundary of the state constraint 260, is an indication that the vehicle 100 will likely encounter undesirable operating conditions (e.g., exiting a lane, colliding with an obstacle, etc.) at that boundary. Whether the boundary defines a spatial boundary, a velocity boundary (e.g., too fast, too slow, etc.), an operational boundary (e.g., turn rate exceeding the maximum for road conditions), or another constraint boundary, the general result if the vehicle 100 were permitted to continue along the predicted target path 280 would be some undesirable condition. As such, when the constraint module 230 determines that the future state 270 violates the state constraint 260, the constraint module 230 modifies the target path 280 of the vehicle 100 to avoid violating the state constraint 260. If the constraint module 230 determines the future state 270 does not violate the state constraint 260, the target path 280 is unmodified and aligns with the future state 270.

In one approach, the constraint module 230 modifies the target path 280 by adjusting the path to align with the state constraint 260 that the future state 270 exceeds. Thus, in one embodiment, the target path 280 is defined according to characteristics that are not only spatial but longitudinal (e.g., max/min speeds), and operational (e.g., max steering angle to maintain traction with the roadway) with respect to operating conditions of the vehicle 100. Thus, by way of example, when the future state 270 exceeds a boundary of the state constraint 260 defining a right lane marker of a roadway, the constraint module 230 modifies the target path 280 to follow along the lane marker with passing over the marker. Thus, the constraint module 230 acts to maintain the vehicle 100 within the state constraints 260 without acting further to adjust the vehicle along a "preferred" path such as a centerline of a lane.

In either case, the constraint module 230 then functions to control the vehicle 100 according to the target path 280 as defined according to the state constraint 260 when the future state exceeds the boundary of the state constraint 260. However, in an instance where the future state does not violate the boundary of the state constraint 260, the constraint module 230 does not adjust the target path 280, that is the target path 280 is defined by the future state 270, since the target path 280 is within a permitted operating range. As such, the constraint module 230 passes the control input of the driver through to the vehicle 100 in order to control the vehicle 100. Thus, unless the driver explicitly violates the state constraint, the control system 170 defers to the control input provided by the driver. Moreover, even in an instance where the future state 270 defined by the control input does violate the state constraint 260, the constraint module 230, in one embodiment, modifies only aspects of the control input as may be necessary to modify the target path 280 to be within the state constraint. In other words, the constraint module 230, in one approach, implements a control algorithm that tracks the target path 280 by minimizing the error between a predicted path and the target path 280. In this way, the control system 170 improves the ride experience of the driver by deferring to the driver in instances where the control inputs are generally within the constraints but still provides for the safety of the vehicle by intervening when necessary.

Figure 3:
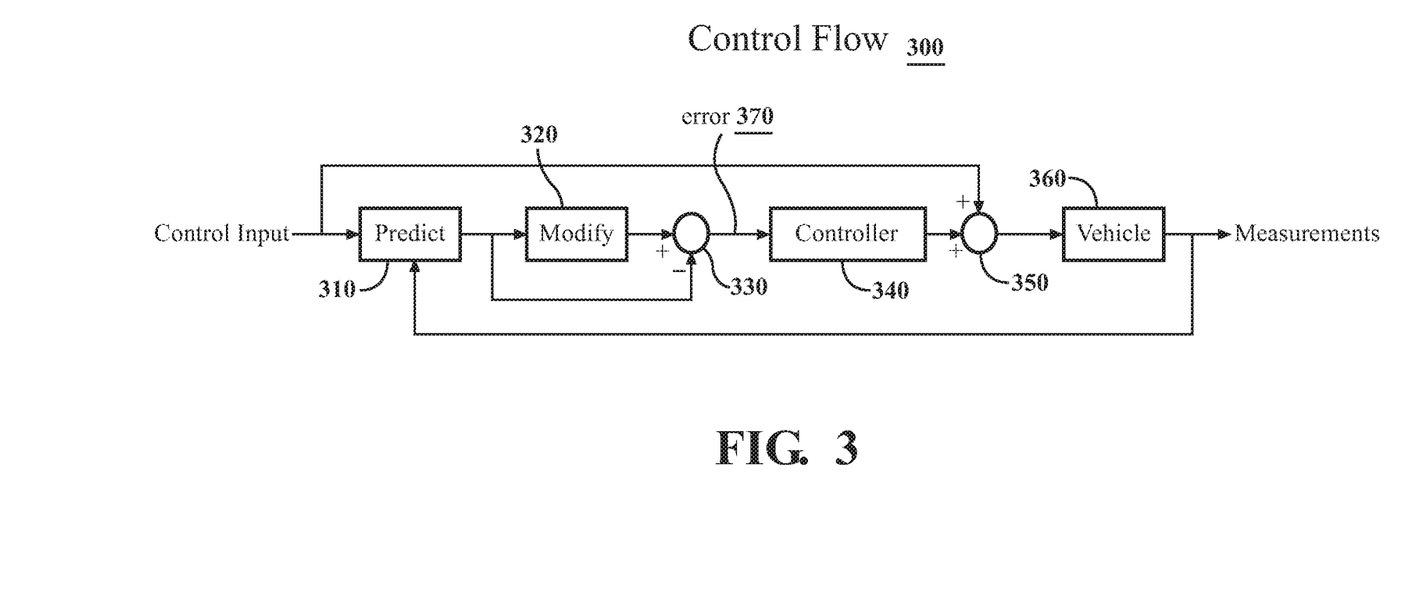
FIG. 3 illustrates one embodiment of a process flow for enforcing state constraints.

As a further example of how the control system 170 implements a process flow to handle predicting the future state 270 of the vehicle 100 and selectively modifying a target path 280, consider FIG. 3. In FIG. 3, a control flow 300 represents decisions of the system 170 and various electronic inputs that influence the decisions. Thus, as a starting point, the control flow 300 accepts one or more control inputs from input devices of the vehicle 100. As previously explained, the control inputs are generally steering, acceleration, and braking inputs provided by a driver through input devices of the vehicle 100. From the control inputs and the measurements of a current state of the vehicle 100, the flow 300 includes using the noted information to predict the future state 270 at block 310. The future state 270 is then provided to block 320 which modifies the future state 270 as needed to create a target path 280 that avoids violating the state constraints 260. The target path 280 is then fed through feedback control algorithm 330, 340, and 350, which minimizes an error 370. In the case when the target path 280 is identical to the unmodified future state 270 and constraints are not violated, the error 370 is zero and the control input is passed directly. Controls resulting from the target path 280 are fed into the vehicle block 360 representing control of the vehicle 100.

Figure 4:
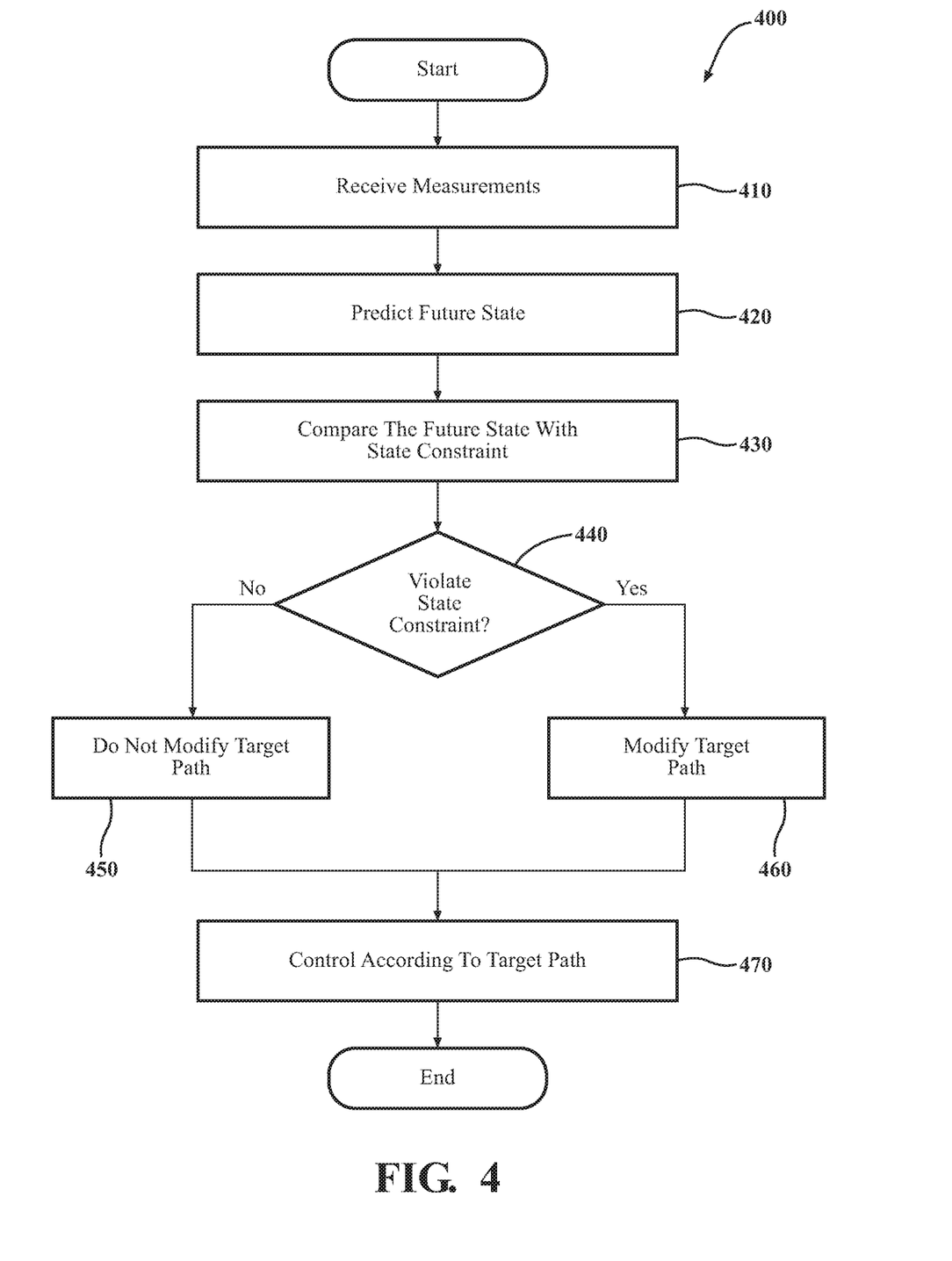
FIG. 4 is a flowchart illustrating one embodiment of a method associated with selectively intervening in manual control of a vehicle.

Additional aspects of selectively intervening in manual control of a vehicle will be discussed in relation to FIG. 4. FIG. 4 illustrates a flowchart of a method 400 that is associated with predicting a future state of a vehicle and determining whether the future state violates state constraints in order to selectively intervene with manual control of the vehicle 100. Method 400 will be discussed from the perspective of the control system 170 of FIGS. 1-2. While method 400 is discussed in combination with the control system 170, it should be appreciated that the method 400 is not limited to being implemented within the control system 170 but is instead one example of a system that may implement the method 400.

At 410, the state module 220 receives measurements of a current state of the vehicle 100. In one embodiment, the state module 220 acquires the measurements from sensors of the vehicle 100 in order to derive a current trajectory of the vehicle 100. Moreover, the state module 220 further acquires the current control input(s) from input devices controlled by the driver. It should be appreciated that in various embodiments, the state module 220 acquires the measurements as the sensor data 250 via one or more sensors of the vehicle 100.

In one embodiment, the state module 220 controls the LiDAR sensor 124 and the camera 126 of the vehicle 100 to observe the surrounding environment. Alternatively, or additionally, the state module 220 controls the camera 126 and the radar 123 or another set of sensors to acquire the sensor data 250. As part of controlling the sensors to acquire the sensor data 250, the sensors acquire the sensor data 250 of a region around the vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the state module 220, in one embodiment, controls the sensors to acquire the sensor data 250 of the surrounding environment, which the state module 220 translates into the current state of the vehicle 100 to characterize current conditions (i.e., a current trajectory) of the vehicle 100.

At 420, the state module 220 predicts a future state 270 of the vehicle 100 according to at least a current state and a control input. In one embodiment, the state module 220 estimates a future path of the vehicle 100 over a defined horizon as a function of at least the current trajectory and the control input to generate the future state 270. As previously described, the state module 220 can predict the future state 270 according to different approaches depending on the particular implementation. However, the future state 270 generally defines a likely state of the vehicle 100 out to the prediction horizon.

In further aspects, the state module 220 predicts future inputs from the driver from which the state module 220 can then extrapolate the current path of the vehicle 100 into the future state 270. In one embodiment, the future inputs account for driver intent as may be developed by the state module from various sources such as routines of the driver, learned patterns, facial recognition, and so on. In either case, the future state 270 is an assessment of a likely state of the vehicle 100 out to the prediction horizon, and thus provides an indicator of likely interactions of the vehicle 100 with the environment. The future state 270 defines a target path 280 that represents a likely path the vehicle 100 will follow as estimated according to the known measurements. As such, the target path 280 defines a subsequent trajectory for the vehicle 100.

At 430, the constraint module 230 compares the future state 270 with a state constraint 260. In one embodiment, the state constraint 260 indicates a range within which the target path 280 of the vehicle is acceptable. Thus, the constraint module 230 determines whether or not the target path 280 as defined by the future state 270 violates the state constraint 260. In general, the constraint module 230 compares the future state 270 with the state constraint 260 by determining whether the future states 270 of the vehicle 100 surpasses (i.e., intersects with and exceeds) the state constraints. Of course, where the state constraint 260 identifies a magnitude of a discrete parameter as opposed to a spatial relationship of the vehicle with an environmental boundary, the constraint module 230 identifies whether the future state 270 violates the state constraint 260 according to a limit defined by a boundary for the state constraint 260. Thus, if the future state 270 satisfies the limit (e.g., exceeds in either a positive or negative direction depending on the limit), then the state constraint 260 has been violated.

At 440, the constraint module 230 analyzes the comparison. If the constraint module 230 determines that the future state 270 violates the state constraint 260, then the constraint module 230 modifies the target path 280 as discussed at block 460. Otherwise, the constraint module 230 does not modify the target path 280 as discussed at block 450, target path 280 is identical to future path 270. In this way, the control system 170 selectively modifies the target path 280 according to whether or not the future state 270 violates the state constraint 260.

At 450, the constraint module 230 passes the future state 270 extrapolated from the control inputs without modification as the target path 280 when the future state 270 does not violate the state constraint 260. The constraint module 230 passes the target path 280 derived from the control inputs in order to cause the vehicle 100 to follow an intent of the driver embodied by the control inputs. In general, by providing the target path 280 without, for example, modification to control subsystems of the vehicle 100, the constraint module 230 passes the control input of the driver. In this way, the control system 170 provides deference to the control inputs of the driver while the control inputs maintain the vehicle 100 within an operating envelope defined by the state constraint 260.

At 460, the constraint module 230 modifies the target path 280. In one embodiment, the constraint module 230 modifies the target path 280 by aligning the target path 280 with a target boundary of the state constraint which the future state 270 violates. Thus, the constraint module 230, in one embodiment, modifies the target path 280 by adjusting future states 270 and thus subsequent control inputs that correspond with one or more time steps ahead of the vehicle 100 such that the target path 280 no longer violates the state constraint 260 but instead, for example, follows along the state constraint 260. In one aspect, the constraint module 230 maintains the target path 280 along/at the boundary of the state constraint 260 that has been violated until a subsequent future state 270 no longer violates the constraint and thus moves the target path 280 away from the constraint.

It should be noted, that in further embodiments, the constraint module 230 selectively modifies the target path 280 by generating the target path 280 as an optimal path for the vehicle 100 according to a constrained optimization. In such an approach, the constraint module 230, for example, implements the constrained optimization by defining the optimal path according to the state constraint 260 when the future state 270 violates the state constraint 260 and according to the future state 270 when the future state 270 does not violate the state constraint 260. The constrained optimization can include applying a model predictive control (MPC) or reference governor routine to determine the optimal path. Thus, the MPC routine implements a cost function to minimize deviations from the control input while accounting for the state constraint 260 such that the target path 280 tracks the control input.

At 470, the constraint module 230 controls the vehicle 100 according to the target path 280. In one embodiment, the constraint module 230 causes the vehicle 100 to track the target path 280 by providing commands that embody the target path 280 to control subsystems of the vehicle 100. For example, in one embodiment, the constraint module 230 communicates commands derived from the target path 280 to the vehicle systems 140 and/or the actuators 150 in order to cause the vehicle 100 to follow the target path 280. In further aspects, the constraint module 230 communicates the target path 280 itself to one or more vehicle systems 140 and/or the input system 130 which translate the target path 280 into commands that control the vehicle 100. In either case, the control system 170 selectively intervenes with controls provided to the vehicle 100 in order to, for example, minimize intervention through providing deference to driver control inputs while also maintaining supervisory awareness and selective control to prevent unsafe operating conditions.

Figure 5:
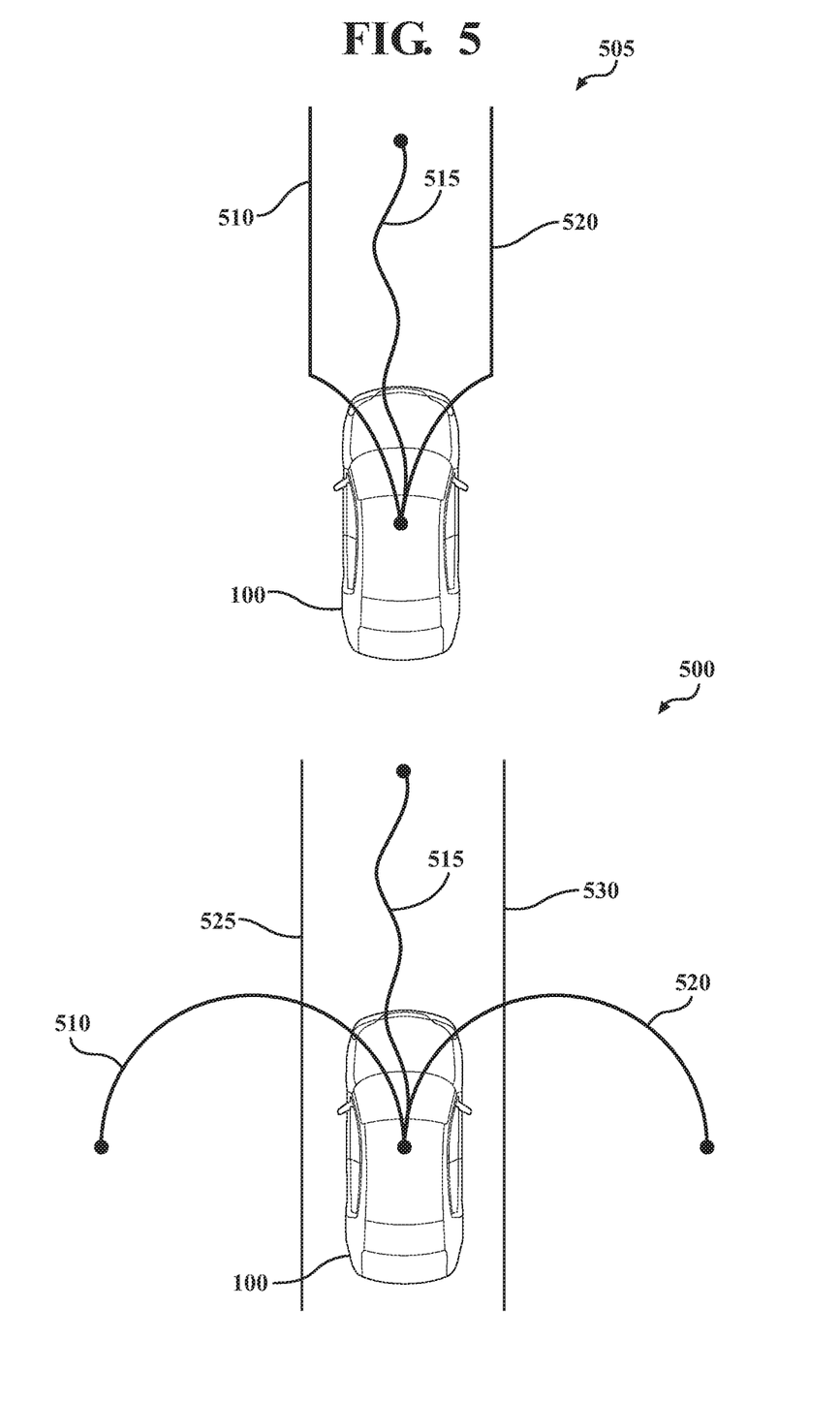
FIG. 5 illustrates one example of a vehicle operating within defined state constraints and how the disclosed system may selectively modify a target path when a future state violates the state constraints.

As a further explanation of how the control system 170 improves intervention in manual control of the vehicle 100, an example of such intervention will now be discussed in relation to FIG. 5. FIG. 5 illustrates predicted future states of the vehicle 100 as shown at 500 and modified target paths 280 at 505. That is, in relation to the illustration 500, three separate scenarios are provided. The scenarios include control inputs and a current trajectory that result in a left target path 510, a center target path 515, and a right target path 520. The separate target paths 510, 515, and 520 each represent separate predictions of future states by the control system 170 resulting from distinct inputs (e.g., control inputs and current states). Illustration 500 is further shown as including state constraints 525 and 530.

More specifically, state constraints 525 and 530 represent boundaries for a lateral position constraint of the vehicle 100 on the roadway. As previously discussed, the boundaries 525/530 for the lateral state constraint are generally derived from sensor data 250 acquired by the vehicle 100 about the environment. Thus, the control system 170 compares the boundaries to the predicted target paths 510, 515, and 520 to determine if the paths 510, 515, 520 violate boundaries of the state constraint. As shown in illustration 500, the paths 510 and 520 intersect and exceed boundaries 525 and 530, respectively. By contrast, the target path 515 does not violate the state constraint as it remains within an acceptable range between the boundaries 525/530 and thus the associated controls are passed to the vehicle 100 for such an occurrence.

The illustration 505 shows how the control system 170 selectively modifies the target path in order to prevent the vehicle 100 from exceeding the state constraint. Thus, as illustrated, the control system 170 has modified the target paths 510 and 520 to align with the constraints 525/530. As a general characteristic of the illustrated approach, the control system 170 provides only the amount of modification necessary to prevent violation of the state constraint as seen in how the target paths 510 and 520 track the constraints after the points where the target paths 510 and 520 originally violated the constraints. Thus, the control system 170 modifies the control inputs to an extent that causes the target path to avoid violating the state constraints. Otherwise, the control inputs are passed through to the vehicle 100, which is generally why the target paths 510 and 520 track along the constraints. Moreover, the target path may continue to track the constraint until a subsequent control input by the driver results in the future state no longer violating the state constraint and that actively moves the vehicle 100 away from the constraint.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the control system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the control system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the control system 170, and/or the autonomous driving module(s) 160 may control some or all of these vehicle systems 140 and, thus, may be partially or fully autonomous.

The processor(s) 110, the control system 170, and/or the autonomous driving module(s) 160 can be operatively connected to communicate with the various vehicle systems 140 and/or individual components thereof. For example, returning to FIG. 1, the processor(s) 110, the control system 170, and/or the autonomous driving module(s) 160 can be in communication to send and/or receive information from the various vehicle systems 140 to control the movement, speed, maneuvering, heading, direction, etc. of the vehicle 100. The processor(s) 110, the control system 170, and/or the autonomous driving module(s) 160 may control some or all of these vehicle systems 140.

The processor(s) 110, the control system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the control system 170, and/or the autonomous driving module(s) 160 can control the direction and/or speed of the vehicle 100. The processor(s) 110, the control system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the constraint module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system for selectively intervening in manual control of a vehicle by a driver, comprising:
   one or more processors;
   a memory communicably coupled to the one or more processors and storing:
   a state module including instructions that when executed by the one or more processors cause the one or more processors to predict, when the driver is manually controlling the vehicle, a future state of the vehicle in a manual mode according to at least a current state and a control input, the current state defining at least one attribute of a current trajectory of the vehicle and the control input defining at least one driver input for controlling the vehicle; and
   a constraint module including instructions that when executed by the one or more processors cause the one or more processors to:

compare the future state with a state constraint indicating a range within which a target path of the vehicle is acceptable for operation in the manual mode, the target path defining a subsequent trajectory for the vehicle, and the range being defined by boundaries for operating the vehicle, and selectively modify the target path along at least one of the boundaries according to whether the future state violates the state constraint to provide automated intervention of the manual control without physically modifying the control input, without adjusting the target path to enforce a preferred path, and by temporarily switching to at least partially autonomous control of the vehicle that prevents violation of the state constraint, including lateral and longitudinal controls, and control the vehicle according to the target path.

2. The control system of claim 1, wherein the constraint module includes instructions to compare the future state with the state constraint including instructions to identify whether the future state violates the state constraint by indicating when the future state exceeds one or more boundaries defining the range, and wherein the constraint module includes instructions to selectively modify the target path including instructions to align the target path with a target boundary of the boundaries which the future state violates to prevent the vehicle from violating the state constraint by causing the vehicle to operate along the target boundary according to the partially autonomous control while preventing the vehicle from exceeding the state constraint.

3. The control system of claim 2, wherein the constraint module includes instructions to control the vehicle according to the target path including controlling the vehicle to follow along the target boundary when the future state violates the state constraint and until a subsequently predicted future state resulting from subsequent control inputs no longer violates the state constraint.

4. The control system of claim 1, wherein the constraint module includes instructions to selectively modify the target path including instructions to pass the control input without modification by defining the target path according to the control input when the future state does not violate the state constraint, wherein the constraint module includes instructions to pass the control input to cause the vehicle to follow an intent of the driver embodied by the control input, and wherein the manual mode of the vehicle includes the control input being passed from the driver without intervention from automated controls.

5. The control system of claim 1, wherein the state module includes instructions to predict the future state including instructions to estimate a future path of the vehicle over a defined horizon as a function of at least the current trajectory and the control input, and wherein the state constraint is defined according to characteristics of one or more of the vehicle and an environment around the vehicle to define safe operating conditions for the vehicle.

6. The control system of claim 5, wherein the state constraint includes operational constraints that define at least limits on the control input, and wherein the state module predicts the future state according to the control input as extrapolated over the defined horizon according to the operational constraints.

7. The control system of claim 1, wherein the state module includes instructions to predict the future state of the vehicle including instructions to predict future inputs from the driver that account for driver intent from which the state module derives the future state of the vehicle.

8. The control system of claim 1, wherein the constraint module includes instructions to selectively modify the target path including instructions to generate the target path as an optimal path for the vehicle according to a constrained optimization that includes defining the optimal path as a function of the state constraint when the future state violates the state constraint and according to the future state when the future state does not violate the state constraint, wherein the constraint module includes instructions to perform the constrained optimization including instructions to apply a model predictive control (MPC) routine that implements a cost function to minimize deviations from the control input while accounting for the state constraint such that the target path tracks the control input.

9. A non-transitory computer-readable medium for selectively intervening in manual control of a vehicle by a driver and including instructions that when executed by one or more processors cause the one or more processors to:

predict, when the driver is manually controlling the vehicle, a future state of the vehicle in a manual mode according to at least a current state and a control input, the current state defining at least one attribute of a current trajectory of the vehicle and the control input defining at least one driver input for controlling the vehicle;

compare the future state with a state constraint indicating a range within which a target path of the vehicle is acceptable for operation in the manual mode, the target path defining a subsequent trajectory for the vehicle, and the range being defined by boundaries for operating the vehicle;

selectively modify the target path along at least one of the boundaries according to whether the future state violates the state constraint to provide automated intervention of the manual control without physically modifying the control input, without adjusting the target path to enforce a preferred path, and by temporarily switching to at least partially autonomous control of the vehicle that prevents violation of the state constraint, including lateral and longitudinal controls; and control the vehicle according to the target path.

10. The non-transitory computer-readable medium of claim 9, wherein the instructions to compare the future state with the state constraint including instructions to identify whether the future state violates the state constraint by indicating when the future state exceeds one or more boundaries defining the range, and wherein the instructions to selectively modify the target path includes aligning the target path with a target boundary of the boundaries which the future state violates to prevent the vehicle from violating the state constraint by temporarily causing the vehicle to operate along the target boundary according to the partially autonomous control while preventing the vehicle from exceeding the state constraint.

11. The non-transitory computer-readable medium of claim 10, wherein the instructions to control the vehicle according to the target path including controlling the vehicle to follow along the target boundary when the future state violates the state constraint and until a subsequently predicted future state resulting from subsequent control inputs no longer violates the state constraint.

12. The non-transitory computer-readable medium of claim 9, wherein the instructions to selectively modify the target path include instructions to pass the control input without modification by defining the target path according to the control input when the future state does not violate the state constraint, and wherein the instructions to pass the control input to cause the vehicle to follow an intent of the driver embodied by the control input, and wherein the manual mode of the vehicle includes the control input being passed from the driver without intervention from automated controls.

13. The non-transitory computer-readable medium of claim 9, wherein the instructions to predict the future state include instructions to estimate a future path of the vehicle over a defined horizon as a function of at least the current trajectory and the control input, and wherein the state constraint is defined according to characteristics of one or more of the vehicle and an environment around the vehicle to define safe operating conditions for the vehicle.

14. A method of selectively intervening in manual control of a vehicle by a driver, comprising:

predicting, when the driver is manually controlling the vehicle, a future state of the vehicle in a manual mode according to at least a current state and a control input, the current state defining at least one attribute of a current trajectory of the vehicle and the control input defining at least one driver input for controlling the vehicle;

comparing the future state with a state constraint indicating a range within which a target path of the vehicle is acceptable for operation in the manual mode, the target path defining a subsequent trajectory for the vehicle, and the range being defined by boundaries for operating the vehicle;

selectively modifying the target path along at least one of the boundaries according to whether the future state violates the state constraint to provide automated intervention of the manual control without physically modifying the control input, without adjusting the target path to enforce a preferred path, and by temporarily switching to at least partially autonomous control of the vehicle that prevents violation of the state constraint, including lateral and longitudinal controls; and controlling the vehicle according to the target path.

15. The method of claim 14, wherein comparing the future state with the state constraint includes identifying whether the future state violates the state constraint by indicating when the future state exceeds one or more boundaries defining the range, and wherein selectively modifying the target path includes aligning the target path with a target boundary of the boundaries which the future state violates to prevent the vehicle from violating the state constraint by causing the vehicle to operate along the target boundary according to the partially autonomous control while preventing the vehicle from exceeding the state constraint.

16. The method of claim 15, wherein controlling the vehicle according to the target path includes causing the vehicle to follow along the target boundary when the future state violates the state constraint and until a subsequently predicted future state resulting from subsequent control inputs no longer violates the state constraint.

17. The method of claim 14, wherein selectively modifying the target path includes passing the control input without modification when the future state does not violate the state constraint, wherein passing the control input causes the vehicle to follow an intent of the driver embodied by the control input, and wherein the manual mode of the vehicle includes the control input being passed from the driver without intervention from automated controls.

18. The method of claim 14, wherein predicting includes estimating a future path of the vehicle over a defined horizon into the future as a function of at least the current trajectory and the control input, and wherein the state constraint is defined according to characteristics of one or more of the vehicle and an environment around the vehicle to define safe operating conditions for the vehicle.

19. The method of claim 18, wherein predicting the future state of the vehicle includes predicting future inputs from the driver that account for driver intent from which the future state of the vehicle is derived, wherein the state constraint includes operational constraints that define at least limits on the control input, and wherein predicting the future inputs includes adjusting the control input over the defined horizon according to the operational constraints.

20. The method of claim 14, wherein selectively modifying the target path includes generating the target path as an optimal path for the vehicle according to a constrained optimization that includes defining the optimal path as a function of the state constraint when the future state violates the state constraint and according to the future state when the future state does not violate the state constraint, wherein the constrained optimization includes applying a model predictive control (MPC) routine that implements a cost function to minimize deviations from the control input while accounting for the state constraint such that the target path tracks the control input.

\* \* \* \* \*